United States Patent
Cheng et al.

(10) Patent No.: US 11,842,421 B1
(45) Date of Patent: Dec. 12, 2023

(54) METHOD AND DISPLAY DEVICE FOR EMBEDDING WATERMARK INFORMATION TO DIMMING SIGNAL OF BACKLIGHT MODULE

(71) Applicant: AUO Corporation, Hsin-Chu (TW)

(72) Inventors: Wei-Ming Cheng, Hsin-Chu (TW); Chao-Wei Li, Hsin-Chu (TW); Cheng-Kuang Wang, Hsin-Chu (TW); Yang-En Wu, Hsin-Chu (TW); Wen-Rei Guo, Hsin-Chu (TW)

(73) Assignee: AUO CORPORATION, Hsin-Chu (TW)

(*) Notice: Subject to any disclaimer, the term of this patent is extended or adjusted under 35 U.S.C. 154(b) by 0 days.

(21) Appl. No.: 18/146,103

(22) Filed: Dec. 23, 2022

(30) Foreign Application Priority Data

Sep. 30, 2022 (TW) .................................. 111137416

(51) Int. Cl.
*G06T 3/20* (2006.01)
*G09G 3/36* (2006.01)
*G06T 1/00* (2006.01)

(52) U.S. Cl.
CPC ............ *G06T 1/0021* (2013.01); *G09G 3/36* (2013.01); *G09G 2320/0626* (2013.01)

(58) Field of Classification Search
None
See application file for complete search history.

(56) References Cited

U.S. PATENT DOCUMENTS

| 2004/0121131 A1* | 6/2004 | Yamaguchi | ........ H04N 1/32208 |
| | | | 428/195.1 |
| 2005/0157149 A1 | 7/2005 | Yamaguchi | |
| 2008/0187170 A1 | 8/2008 | Matsubayashi | |
| 2012/0293537 A1 | 11/2012 | Takami | |
| 2019/0043163 A1* | 2/2019 | Liu | ........................ G09G 3/36 |

FOREIGN PATENT DOCUMENTS

| KR | 20050115805 A | 12/2005 |
| TW | 200411407 A | 7/2004 |
| TW | 200841707 A | 10/2008 |
| TW | 201911849 A | 3/2019 |

* cited by examiner

*Primary Examiner* — Andrew H Lam
(74) *Attorney, Agent, or Firm* — WPAT, P.C.

(57) ABSTRACT

The present disclosure provides a watermark embedding method including following steps. Values of predetermined grayscale program are respectively multiplied by a value of time series data to generate grayscale information of a watermark signal. In a first time period and a second time period included in each of continuous cycles, phases of the time series data are opposite and averages values of the predetermined grayscale program are the same, and a sum of the grayscale information of the watermark signal in the first time period and the second time period is zero. The watermark signal is embedded into a first local dimming signal by the processing circuit to generate a second local dimming signal to control light intensities of local dimming zones according to the second local dimming data with the watermark information.

20 Claims, 13 Drawing Sheets

METHOD AND DISPLAY DEVICE FOR EMBEDDING WATERMARK INFORMATION TO DIMMING SIGNAL OF BACKLIGHT MODULE

CROSS-REFERENCE TO RELATED APPLICATION

This application claims priority to Taiwan Application Serial Number 111137416, filed Sep. 30, 2022, which is herein incorporated by reference in its entirety.

BACKGROUND

Technical Field

The present disclosure relates to a watermark embedding method, and in particular to a watermark embedding method for controlling a display device to display images comprising the embedded watermark which is hard to be perceived by human eyes.

Description of Related Art

Nowadays, people rely increasingly on display devices, and user often utilizes the display devices to present report, data, image and/or video. However, if a video displayed by a display device without any source notification, it will be difficult to trace the source thereof when an image captured from the video is spread throughout networks. Therefore, how to improve the situation that the source of the captured image is hard to be traced is an important issue in this field.

SUMMARY

An aspect of the present disclosure relates to a watermark embedding method. A first local dimming signal is generated, by a processing circuit, according to an input video signal. Grayscale information of a watermark signal is generated by multiplying values of a predetermined grayscale program by value of time series data, by the processing circuit, respectively, and during a first time period and a second time period in each of a plurality of continuous cycles, phases of the time series data are opposite and integral values of the predetermined grayscale program are the same, to control a sum of the grayscale information of the watermark signal during the first time period and the second time period in each of the continuous cycles to be zero. The watermark signal is embedded into the first local dimming signal, by the processing circuit, to generate a second local dimming signal with watermark information. The light intensities of a plurality of local dimming zones are controlled, by a backlight module, according to the second local dimming signal with the watermark information.

An aspect of the present disclosure relates to a display device. The electronic device includes a processing circuit, a memory device. The memory device electrically coupled to the processing circuit. The memory device is configured to store instructions and data accessed and executed by the processing circuit. The processing circuit is configured to perform the following steps. Multiply a time series data and a predetermined grayscale program, by the processing circuit, to generate grayscale information of a watermark signal, and during a first time period and a second time period comprised in each of a plurality of continuous cycles, phases of the time series data are opposite and integral values of the predetermined grayscale program are the same, and a sum of the grayscale information of the watermark signal during each of the continuous cycles is controlled to be zero. Embed the watermark signal into a first local dimming signal, by the processing circuit, to generate a second local dimming signal with watermark information. Provide the second local dimming signal to a backlight module, and wherein the backlight module control light intensities of a plurality of local dimming zones according to with the watermark information.

Summary, the present disclosure provide a watermark embedding method to provide a watermark pattern to be rendered in backlight intensities providing by the local dimming in high dynamic range, and the watermark pattern varied at high frequency between multiple grayscale values can be rendered in a video displayed by the display device, and the possibility for capturing the image with watermark by camera can be increased. And, the watermark variated at high refresh rate of the backlight module between the bright state and the dark state is hard to be perceived by human eyes.

DETAILED DESCRIPTION

The terms used in this specification generally have their ordinary meanings in the art. The above vocabulary is defined in the commonly used dictionary, and any examples of the use of the vocabulary discussed herein are included in the description of the specification, and are not intended to limit the scope and meaning of the disclosure. Likewise, the disclosure is not limited to various embodiments given in this specification.

The terms "comprises", "includes", etc., as used herein, are all open terms, meaning "including but not limited to". Further, "and/or" as used herein includes any one or combination of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
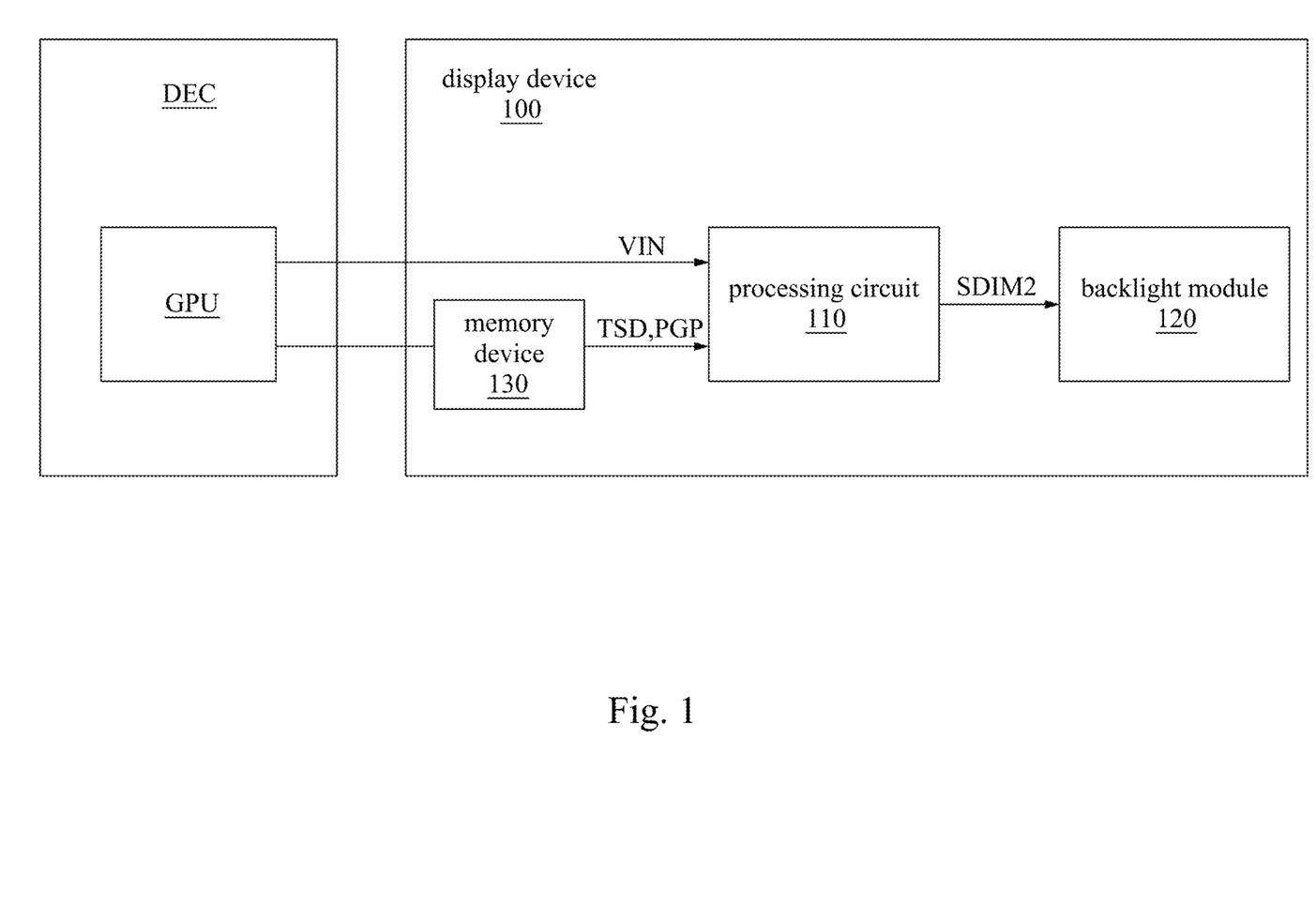
FIG. 1 shows a schematic diagram of a display device and an electronic device according to some embodiments of the present disclosure.

Referring to FIG. 1, FIG. 1 shows a schematic diagram of a display device 100 and an electronic device DEC according to some embodiments of the present disclosure. In some embodiments, the display device 100 can be considered as a display. In other embodiments, the display device 100 can be considered as a screen and related elements, component, circuit and/or module included in a computer, a panel or a mobile device.

As shown in FIG. 1, the display device 100 includes a processing circuit 110, a memory device 130 and a backlight module 120. In some embodiments, the processing circuit 110 can be implemented by central processing unit, microprocessor, graphics processing unit, field-programmable gate array integrated circuit (FPGA), application-specific integrated circuit (ASIC) or other hardware adapted for accessing and/or executing instructions and/or data stored in memory device.

The memory device 130 can be implemented by electrical, magnetic or optical memory device or other memory device capable for storing in instructions and/or data. In some embodiments, the memory device 130 can be implemented by volatile memory device or nonvolatile memory device. In some embodiments, the memory device 130 can be implemented by random access memory (RAM), dynamic random access memory (DRAM), magnetoresistive random access memory (MRAM), phase-change random access memo (PCRAM) or other memory device.

In some embodiments, the backlight module 120 is configured to provide backlight with appropriate light intensity for the display device 100 to display image. In some embodiments, the backlight module 120 supports dynamic local dimming techniques. In some embodiments, the backlight module 120 includes 288, 1024 or other number of local dimming zones. Therefore, it is not intend to limit the present disclosure.

In some embodiments, the display device 100 receives an input video signal VIN form a graphic processing unit GPU included in an electronic device DEC. The processing circuit 110 of the display device 100 generates a first local dimming signal according to the input video signal VIN, and the processing circuit 110 generates grayscale information of a watermark signal according to a time series data TSD and a predetermined grayscale program PGP. In some embodiments, the time series data TSD is configured to determine the display timing for the watermark to be displayed in a relatively bright state or a relatively dark state. The processing circuit 110 embeds the grayscale information of the watermark signal into the first local dimming signal SDIM1 to generate a second local dimming signal SDIM2 with watermark information, such that the backlight module 120 controls light intensities of the local dimming zones according to the second local dimming signal SDIM2 with the watermark information.

Figure 2:
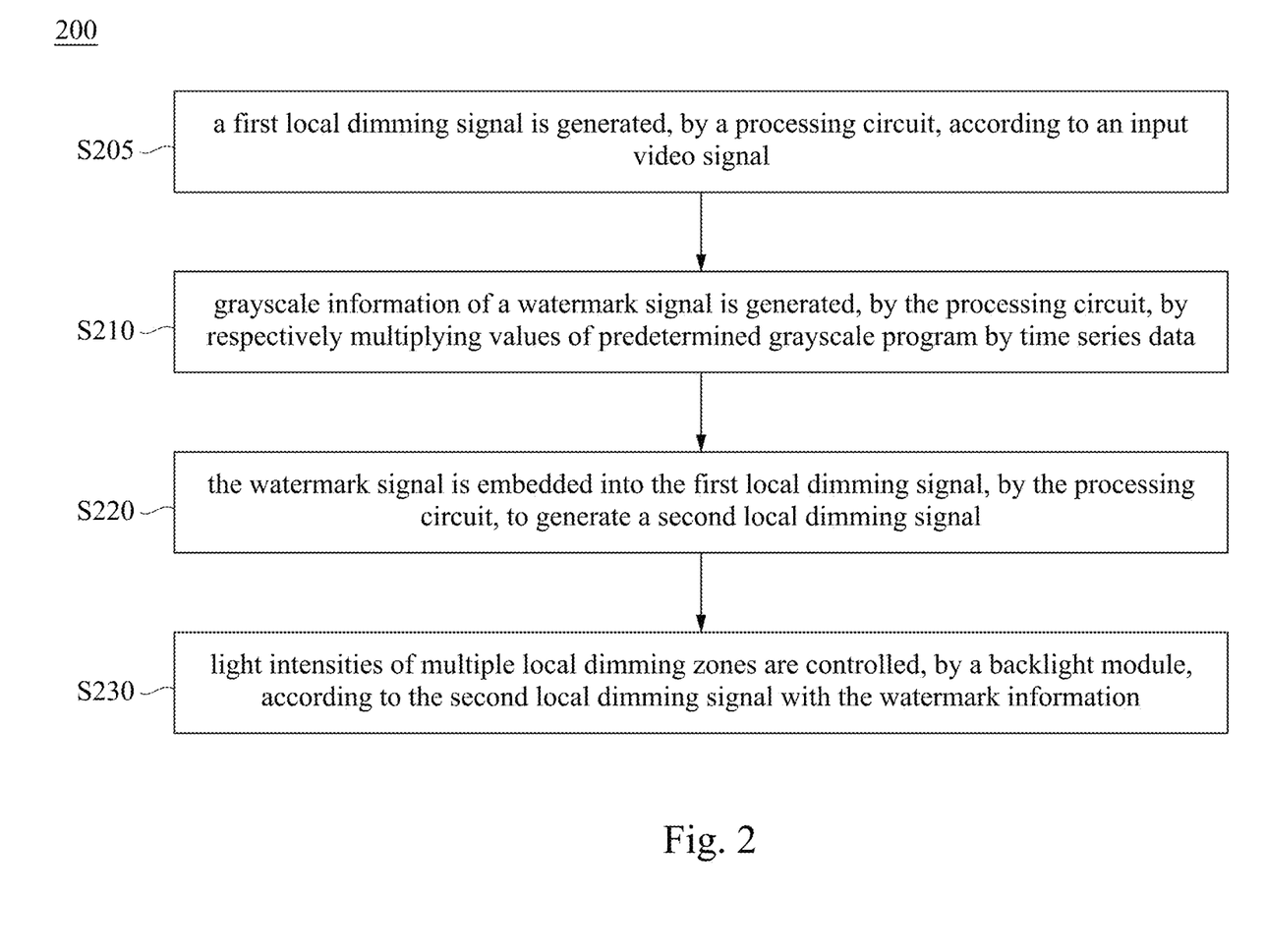
FIG. 2 shows a flowing chart of a watermark embedding method according to some embodiments of the present disclosure.
Figure 3:
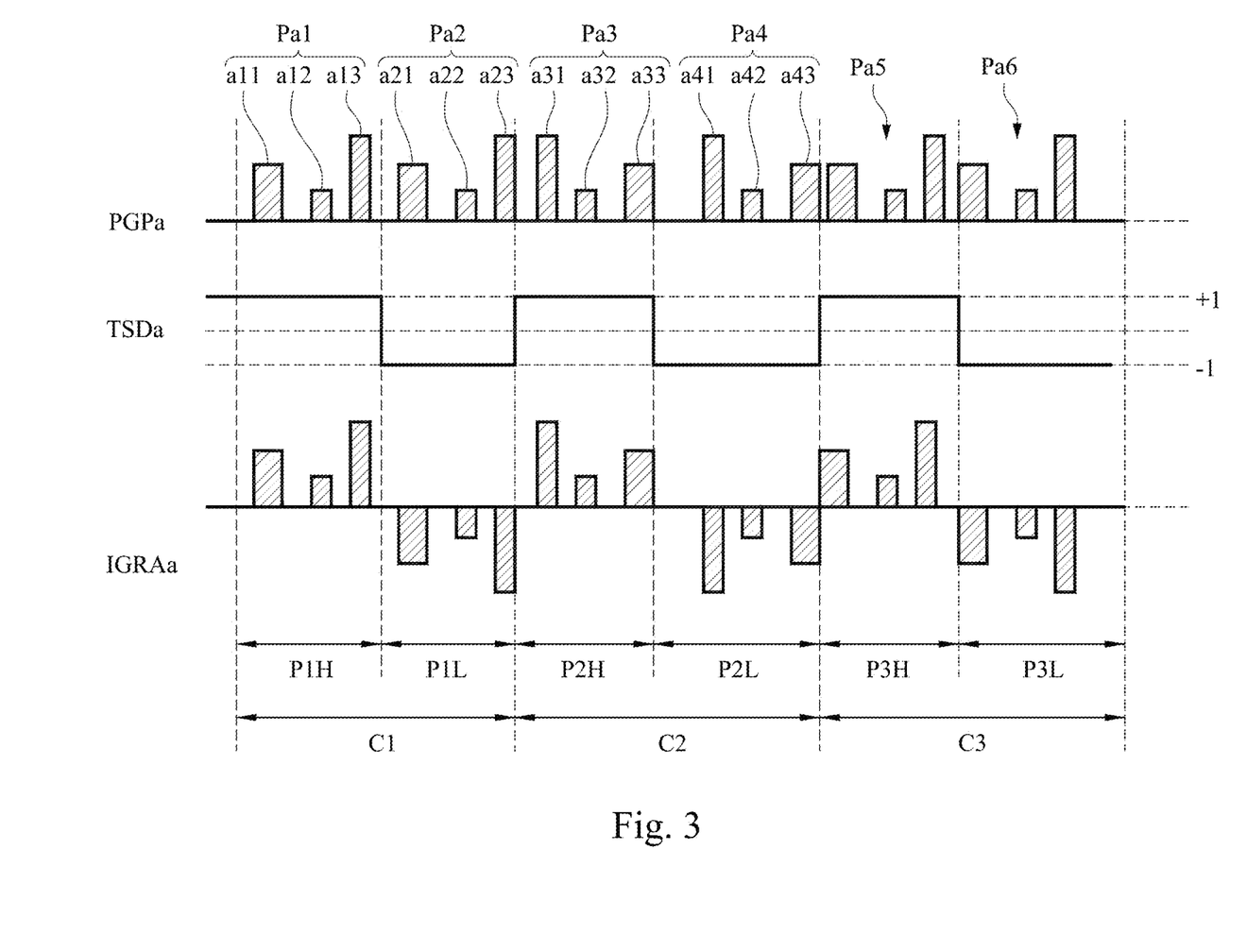
FIG. 3 shows a schematic diagram of a predetermined grayscale program, time series data and grayscale information of a watermark signal according to some embodiments of the present disclosure.
Figure 4:
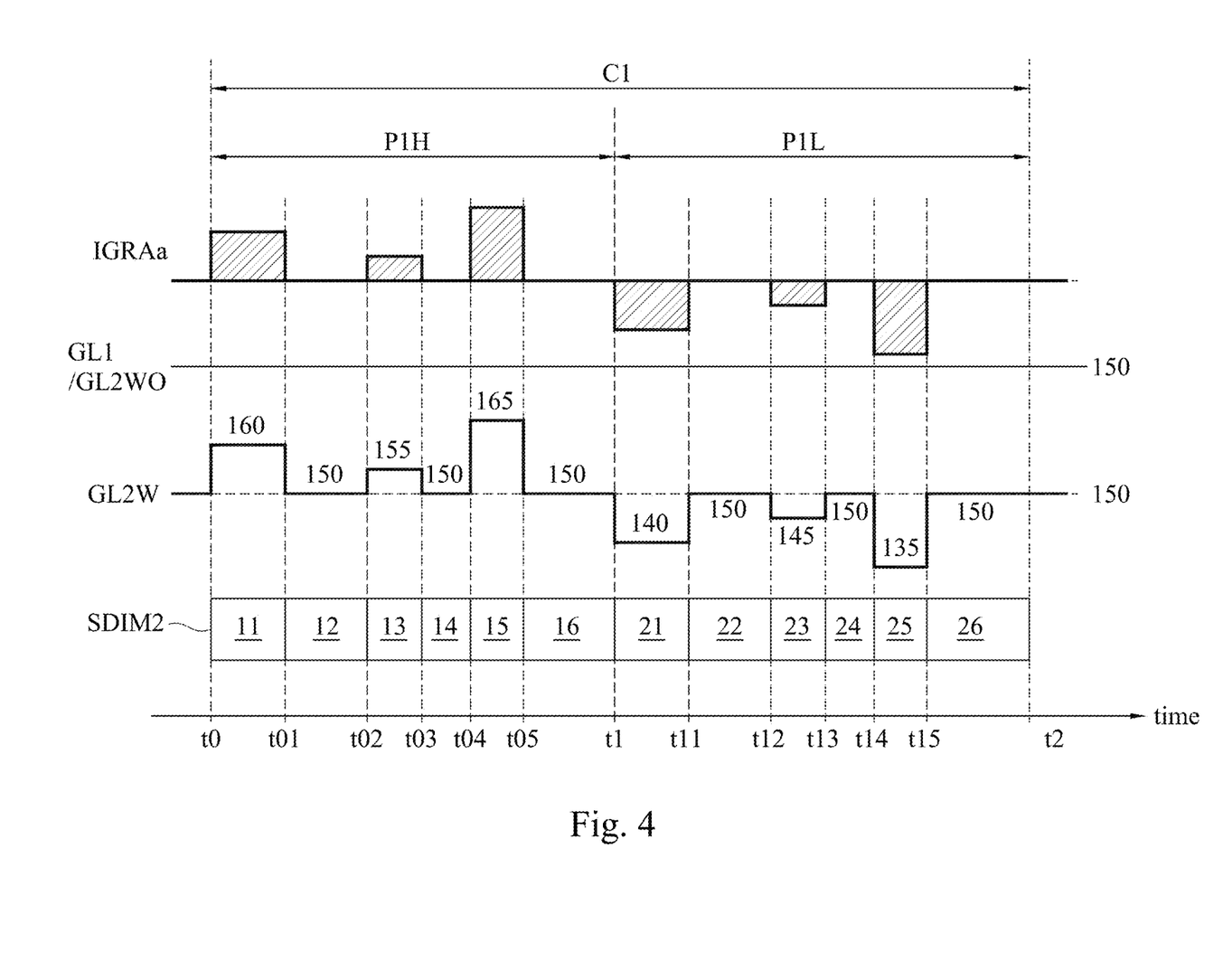
FIG. 4 shows a schematic diagram of grayscale information of a watermark signal, a first local dimming signal and a second local dimming signal according to some embodiments of the present disclosure.
Figure 5A:
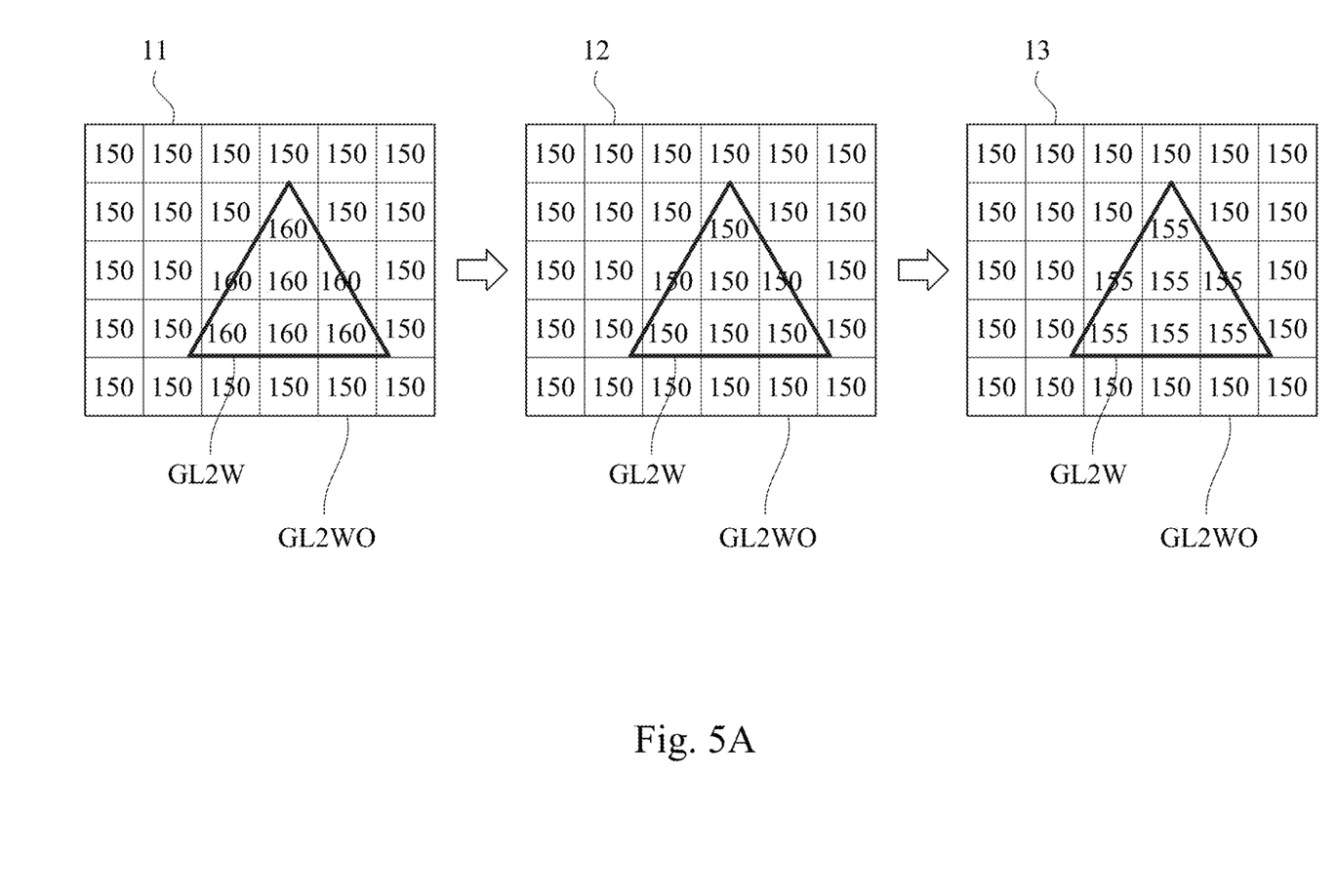
FIGS. 5A and 5B show schematic diagrams of grayscale information of a second local dimming signal for a region with watermark and region without watermark according to some embodiments of the present disclosure.
Figure 5B:
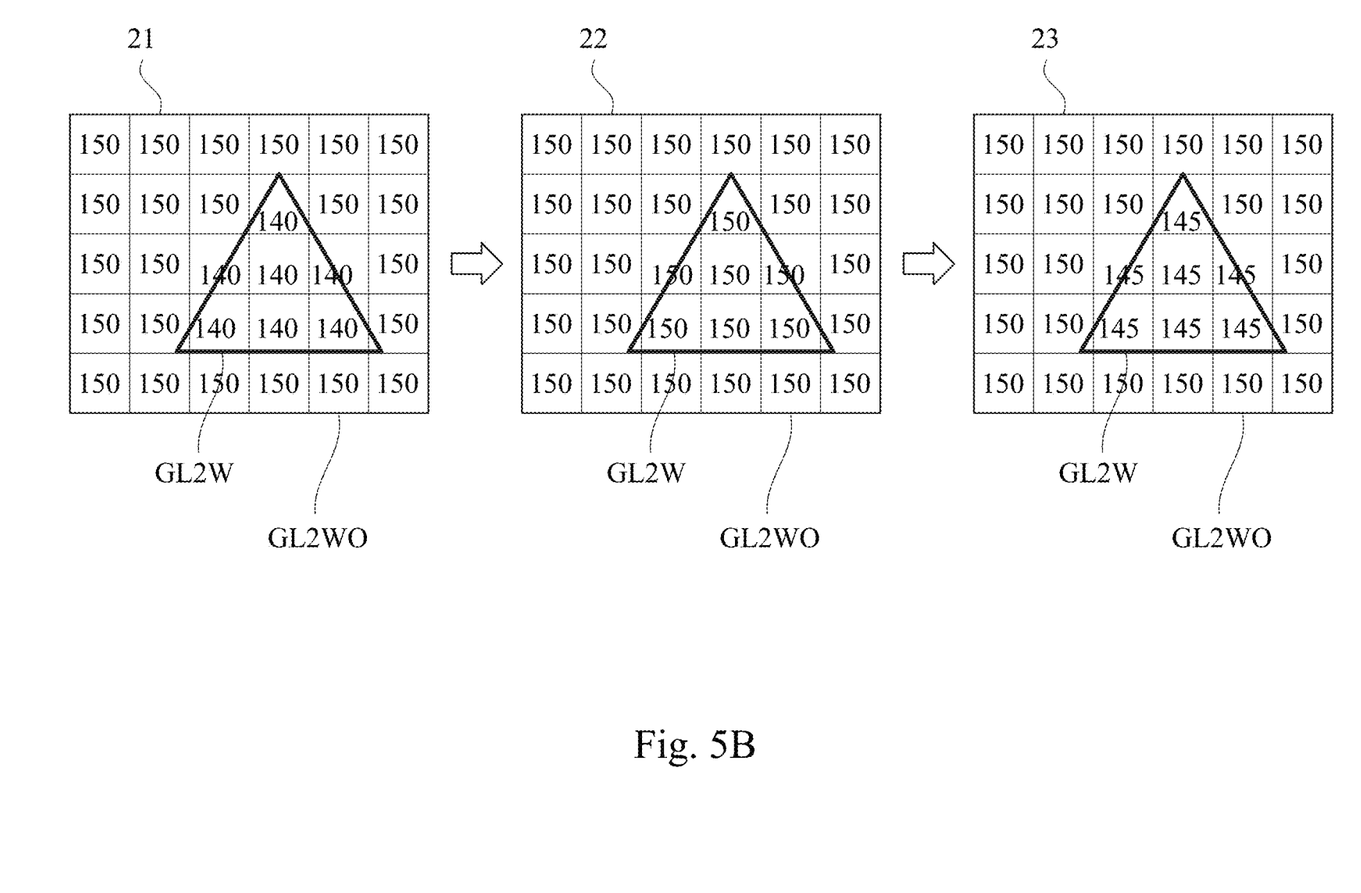
Figure 6:
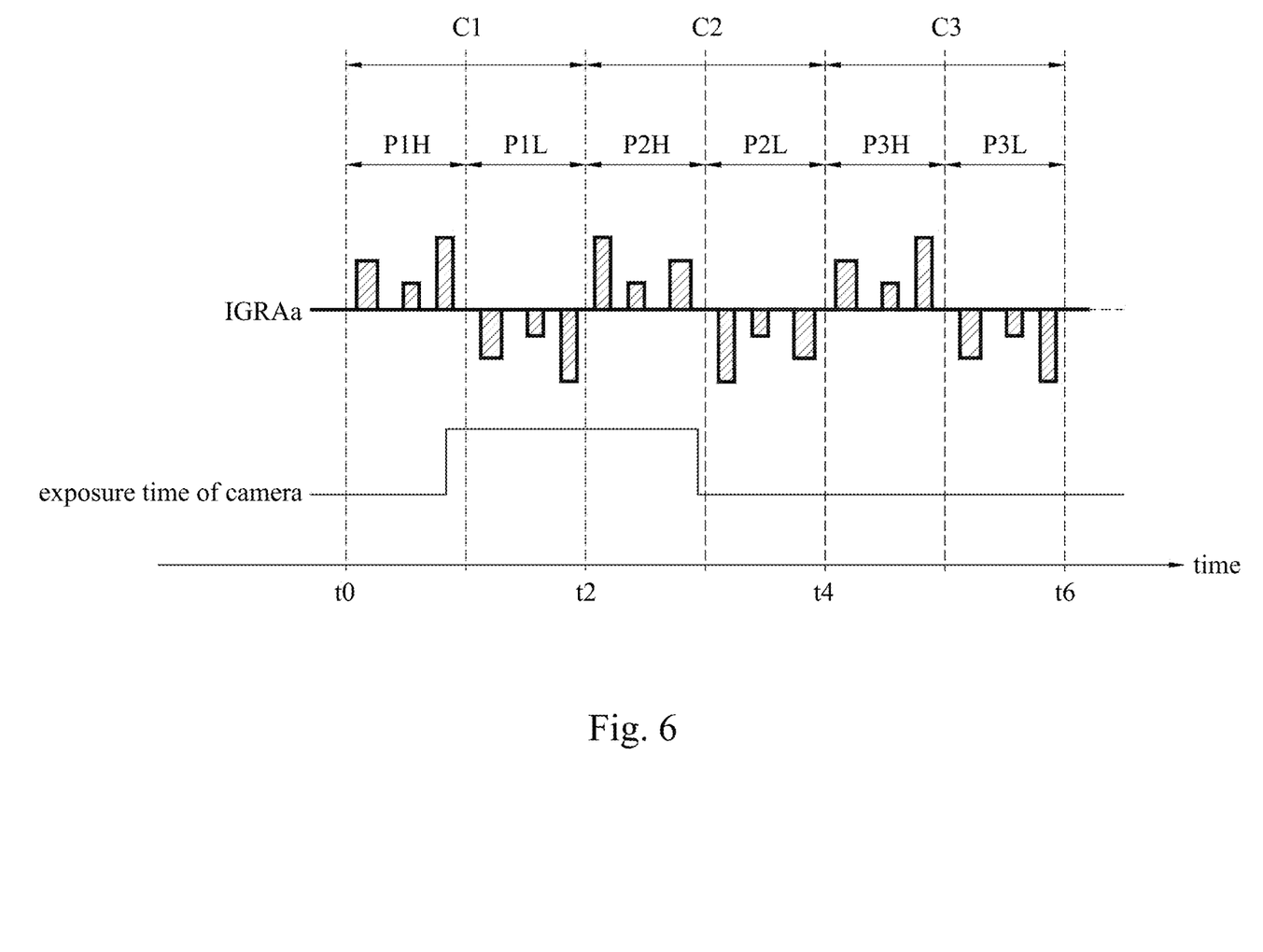
FIG. 6 shows a schematic diagram of grayscale information of a watermark signal and exposure time of camera according to some embodiments of the present disclosure.

Reference is made to FIGS. 1~6. FIG. 2 shows a flowing chart of a watermark embedding method 200 according to some embodiments of the present disclosure. FIG. 3 shows a schematic diagram of a predetermined grayscale program PGPa, time series data TSDa and grayscale information IGRAa of a watermark signal according to some embodiments of the present disclosure. FIG. 4 shows a schematic diagram of grayscale information IGRAa of a watermark signal, grayscale data GL1 of a first local dimming signal SDIM1 and grayscale data GL2 of a second local dimming signal SDIM2 according to some embodiments of the present disclosure. FIGS. 5A and 5B show a schematic diagram of grayscale information GL2W and GL2WO and a second local dimming signal for areas with watermark data and without watermark data according to some embodiments of the present disclosure. FIG. 6 shows a schematic diagram of grayscale information IGRAa of a watermark signal and exposure time of camera according to some embodiments of the present disclosure.

As shown in FIG. 2, the watermark embedding method 200 includes steps S205, S210~S230. In step S205, a first local dimming signal is generated by a processing circuit 110 according to an input video signal VIN. Specifically, the processing circuit 110 receives the input video signal VIN from the graphic processing unit GPU. In some embodiments, the processing circuit 110 generates a local dimming signal according to variation of adjacent frames of the input video signal VIN. The backlight module 120 controls the local dimming zones according to the local dimming signal to perform local dimming operation, so as to enhance the contrast of light and dark of the display image.

In step S210, grayscale information IGRAa of a watermark signal is generated, by the processing circuit, by respectively multiplying values of predetermined grayscale program PGPa by time series data TSDa. In some embodiment, time series data TSDa includes multiple continuous cycles (such as, cycles C1~C3). In some embodiments, a reciprocal of time length of each cycle corresponds to a fresh rate of the display device 100. In other embodiments, a multiple of reciprocal of time length of each cycle corresponds to a fresh rate of the display device 100. In some embodiments, one cycle (such as, a cycle C1) included in the time series data TSDa includes two time periods (such as, a first time period P1H and a second time period P1L).

In some embodiments, in the first time period P1H, the time series data TSDa has a positive phase which can be implemented by a value of +1. Grayscale values a11~a13 of the predetermined grayscale program PGPa are generated by respectively multiplying values included in the grayscale information IGRAa by the value of +1 to generate a part of values in a positive range, so as to render the watermark in a relatively bright state. In some embodiments, the first time period P1H can be considered as a bright state period of watermark.

On the other hand, in the second time period P1L, the time series data TSDa has a negative phase which can be implemented by a value of −1. Grayscale values a21~a23 of the predetermined grayscale program PGPa are respectively multiplied by the value of −1 to generate the other part of values included in the grayscale information IGRAa in a negative range, so as to render the watermark in a relatively dark state. In some embodiments, the first time period P1L can be considered as a dark state period of watermark. In some embodiments, a time length of the first time period P1H is equal to a time length of the second time period P1L.

The predetermined grayscale program PGPa includes data program Pa1~Pa6. The data program Pa1~Pa6 correspond to continuous cycles C1~C3, respectively. In some embodiments, integral values of each data program Pa1~Pa6 with respect to time are equal to each other, and a sum of the grayscale information IGRAa of the watermark signal for each cycles C1~C3 can be controlled to be zero.

For example, in a first time period P1H, the data program Pa1 includes grayscale values a11~a13 (or grayscale proportion) of 10, 5 and 15 with time lengths of 2 t sec, 2 t sec and 1 t sec, respectively. The aforesaid "t" can be any positive value. On the other hand, in a second time period P1L, the data program Pa2 includes grayscale values a21~a23 of 10, 5 and 15 with time lengths of 2 t sec, 2 t sec and 1 t sec, respectively. Therefore, an integral value of grayscale value of the data program Pa2 with respect to time is equal to an integral value of grayscale value of the data program Pa1 with respect to time.

The processing circuit 110 generates grayscale information IGRAa of the watermark signal for the first time period by multiplying the grayscale values a11~a13 included in the data program Pa1 by a value of +1 in time series data TSDa, respectively. And, the processing circuit 110 generates grayscale information IGRAa of the watermark signal during the second time period by respectively multiplying the grayscale values a21~a23 included in the data program Pa2 by a value of −1 in time series data TSDa.

As a result, in the cycle C1, a sum of the grayscale information IGRAa in the first time period and the second time period is equal to zero. In this case, the watermark signal with the grayscale information IGRAa can be embedded into the input video signal to generate output video signal so as to display the image according to the output video signal. Due to the persistence of vision, the watermark in the displayed image is hard to be perceived by human eyes. And, the integral of the displayed image in an exposure time of a camera is difficult to offset the difference between watermark and original image because of the arrangements of the data programs Pa1~Pa6. Therefore, after the camera focuses at one frame of the displayed image at high/low brightness and captures an image form the displayed image, the probability for the watermark rendered in the captures image can be increased.

To be noted that, the time lengths of gray level values a11~a13 can be different from each other (which are non-periodically), and the probability for capturing the watermark by the camera can be further increased. In other embodiments, the time lengths of the grayscale values a11~a13 are equal to each other (which are periodically). Therefore, it is not intend to limit the present disclosure.

In the embodiment of FIG. 3, an arrangement of the grayscale values a11~a13 included in data program Pa1 is translation symmetric with respect to an arrangement of the grayscale values a21~a23 included in data program Pa2 on time line. In another embodiment, an arrangement of the grayscale values included in data program Pa1 can be mirror symmetric with respect to an arrangement of the grayscale values included in data program Pa2 on time line. In the other embodiment, an arrangement of the grayscale values included in data program Pa1 can be asymmetric with respect to an arrangement of the grayscale values included in data program Pa2 on time line. Therefore, it is not intend to limit the present disclosure.

In step S220, the watermark signal is embedded into the first local dimming signal SDIM1 by the processing circuit 110 to generate a second local dimming signal SDIM2, such that the second local dimming signal SDIM2 includes watermark information. As shown in FIG. 4. in the cycle C1, the grayscale information IGEAa is embedded into the grayscale data of the first local dimming signal SDIM1. For better understanding, grayscale values of all of the local dimming zones are taken 150 for example. In the watermark embedded mode, a part of the local dimming zones are displayed zones of watermark, and the other part of the dimming zones are non-displayed zones of watermark.

For the displayed zones of watermark, the grayscale information IGEAa of the watermark signal is embedded into the grayscale data GL1 of the first local dimming signal SDIM1 to generate grayscale data GL2W. As shown in FIGS. 5A and 5B, the grayscale data GL2W is outputted as grayscale information for the displayed zones of watermark.

For the non-displayed zones of watermark, the grayscale data GL1 of the first local dimming signal SDIM1 is outputted as the grayscale data GL2WO. As shown in FIGS. 5A and 5B, the grayscale data GL2WO is outputted as grayscale information for the non-displayed zones of watermark.

The processing circuit 110 generates the second local dimming signal SDIM2 according to the grayscale data GL2W and grayscale data GL2WO, and therefore the second local dimming signal SDIM2 includes the watermark information, as shown in FIGS. 5A and 5B.

In step S230, light intensities of multiple local dimming zones are controlled by a backlight module according to the second local dimming signal with the watermark information. As shown in FIG. 5A, during the first time period P1H, the displayed zones of watermark (such as, the triangle region in the embodiment of FIG. 5A) emits at higher light intensity and the non-displayed zones of watermark emits at lower light intensity (such as, region outside the triangle region in the embodiment of FIG. 5A), according to the output data 11 and 13 of the second local dimming signal SDIM2. As shown in FIG. 5B, during the second time period P1L, the displayed zones of watermark (such as, the triangle region in the embodiment of FIG. 5B) emits at lower light intensity and the non-displayed zones of watermark emits at higher light intensity (such as, region outside the triangle region in the embodiment of FIG. 5B) according to the output data 24 and 23 of the second local dimming signal SDIM2.

And, since the integral of the displayed image in the exposure time of a camera is difficult to offset the difference between watermark and original image because of the arrangements of the data programs Pa1~Pa6, the probability for watermark rendered in the image captured, by the camera, from the displayed image can be increased.

Figure 7:
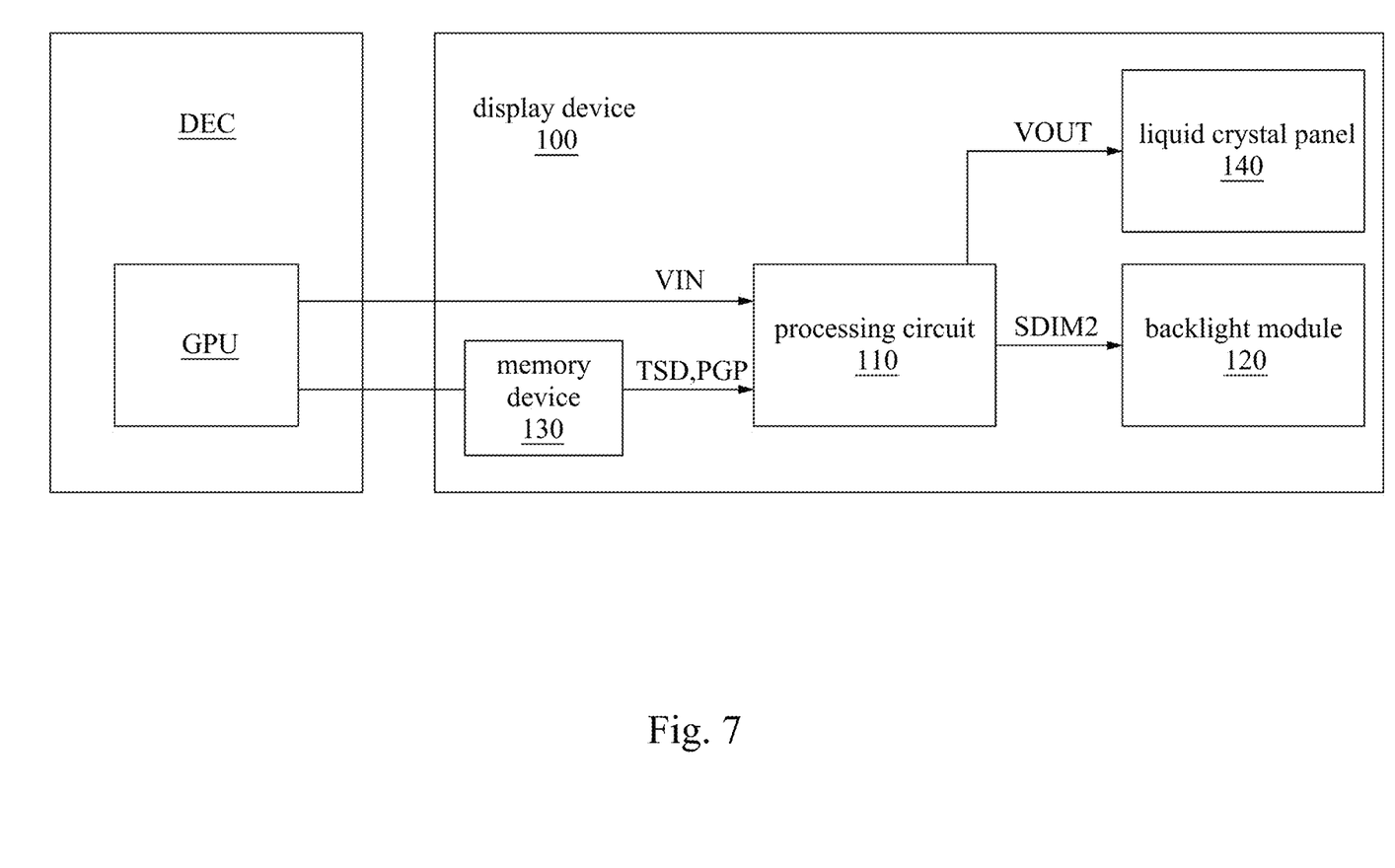
FIG. 7 shows a schematic diagram of a display device and an electronic device according to some embodiments of the present disclosure.
Figure 8:
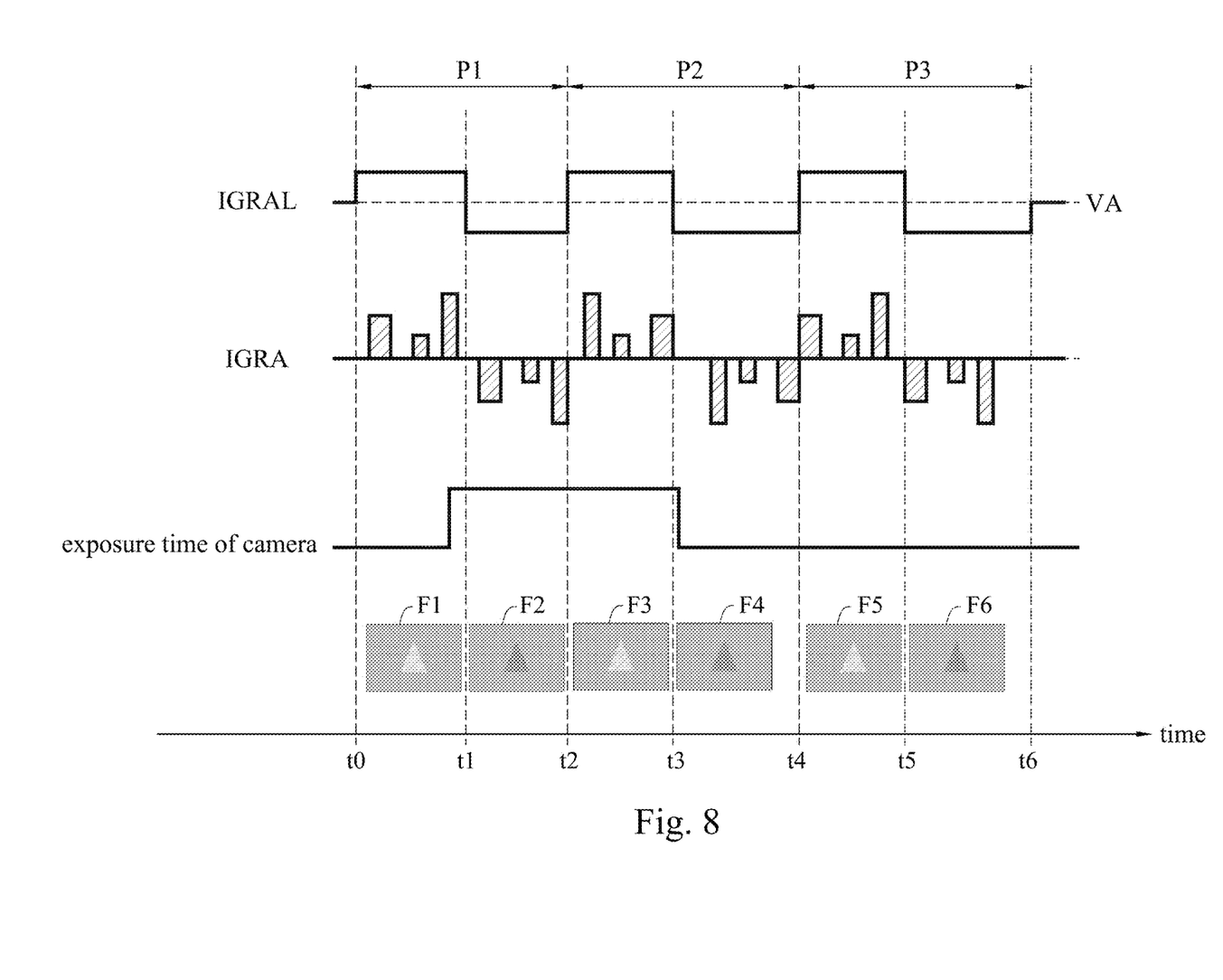
FIG. 8 shows a schematic diagram of a low dynamic watermark signal and an electronic device according to some embodiments of the present disclosure.

Reference is made to FIGS. 7~8. FIG. 7 shows a schematic diagram of a display device 100 and an electronic device DEC according to some embodiments of the present disclosure. FIG. 8 shows a schematic diagram of grayscale information IGRAL of a low dynamic watermark signal and grayscale information IGRA of an electronic device according to some embodiments of the present disclosure.

In the embodiment of FIG. 7, the display device 100 is further includes a liquid crystal panel 140. In some embodiments, the processing circuit 110 obtains a first average value of the watermark signal during a bright state of the watermark, and the processing circuit 110 obtains a second average value of the watermark signal during a dark state of the watermark. The processing circuit 110 outputs the first average value and the second average value as grayscale information IGRA of a low dynamic watermark signal. As a result, the processing circuit 110 can embed the low dynamic watermark signal into a input video signal VIN to generate the output video signal VOUT with grayscale information to the liquid crystal panel 140, such that the sub frames F1~F6 includes the watermark (such as, the triangle pattern in the sub frames F1~F6) variated between the relatively bright state and the relatively dark state.

In this case, the liquid crystal panel 140 and the backlight module 120 of the display device 100 synchronizing display the image according to the output video signal VOUT (with grayscale information IGRAL to be displayed by pixels in a displayed region of watermark) and the second local dimming signal SDIM2 (with grayscale information IGRAa to be displayed by local dimming zones in the displayed region of watermark), so as to enhance the probability of the watermark rendered in the image can be captured by the camera and also to improve the clarity of the watermark rendered in the captured image.

To be noted that, the low dynamic watermark signal for the liquid crystal panel 140 is relative to the watermark signal for the backlight module 120. The image displayed according the output video signal VOUT embedded by the said low dynamic watermark signal also cannot be perceived by human eyes. In some embodiments, each cycles C1~C6 of the low dynamic watermark signal corresponding to one frame length of the display device 100 (such as, 1/30 sec, 1/60 sec or 1/120 sec).

Figure 9:
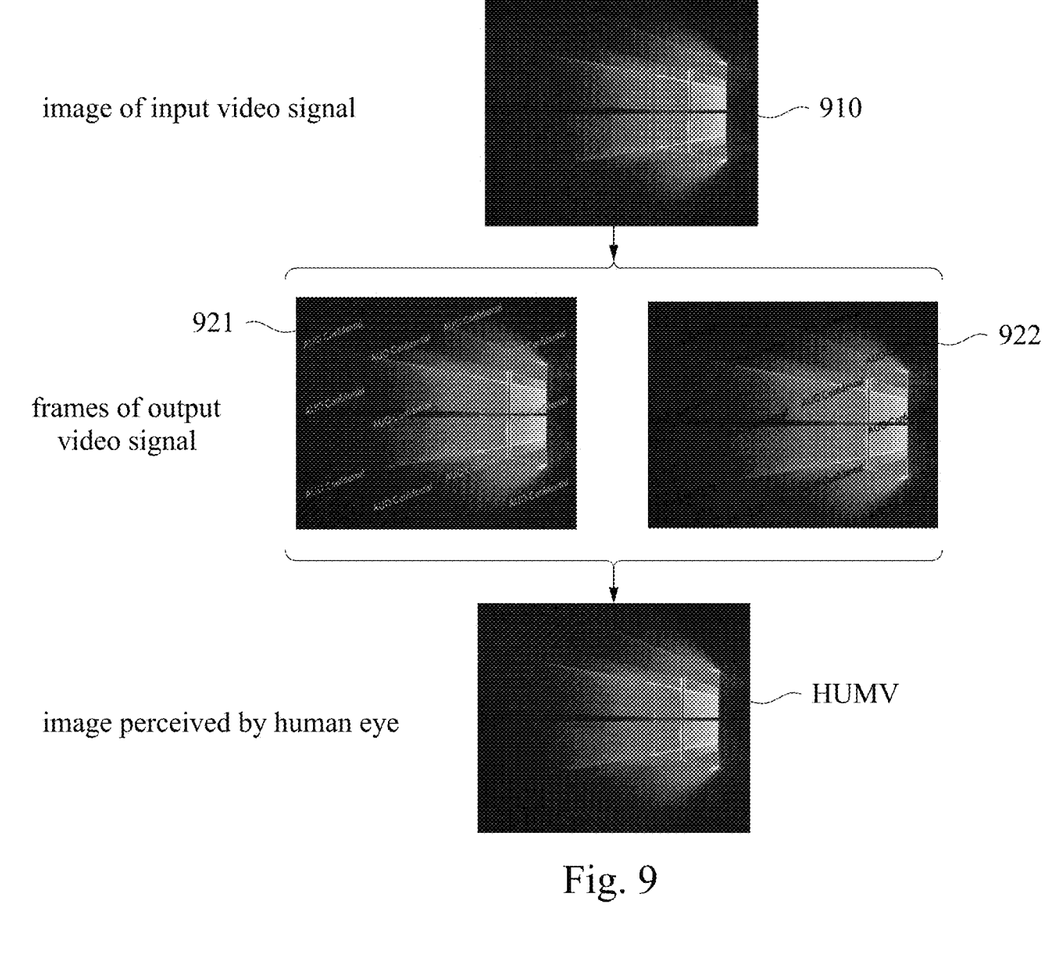
FIG. 9 shows a schematic diagram of an image of an input video, sub frame of a display video and image perceptible by human visual according to some embodiments of the present disclosure.

Reference is made to FIG. 9. FIG. 9 shows a schematic diagram of an image 910 of an input video, sub frame images 921 and 922 of a display video and image HUMV perceptible by human visual according to some embodiments of the present disclosure. In the embodiment of FIG. 9, the sub frame image 921 corresponds to images of the sub-frames F1, F3 and F5 in FIG. 8. The sub frame image 922 corresponds to images of the sub-frames F2, F4 and F6 in FIG. 8.

The sub frame images 921 includes the watermark at relatively bright state, and the sub frame images 922 includes the watermark at relatively dark state, and the watermark information rendered in images of the output video signal cannot be perceived by human eyes.

Figure 10A:
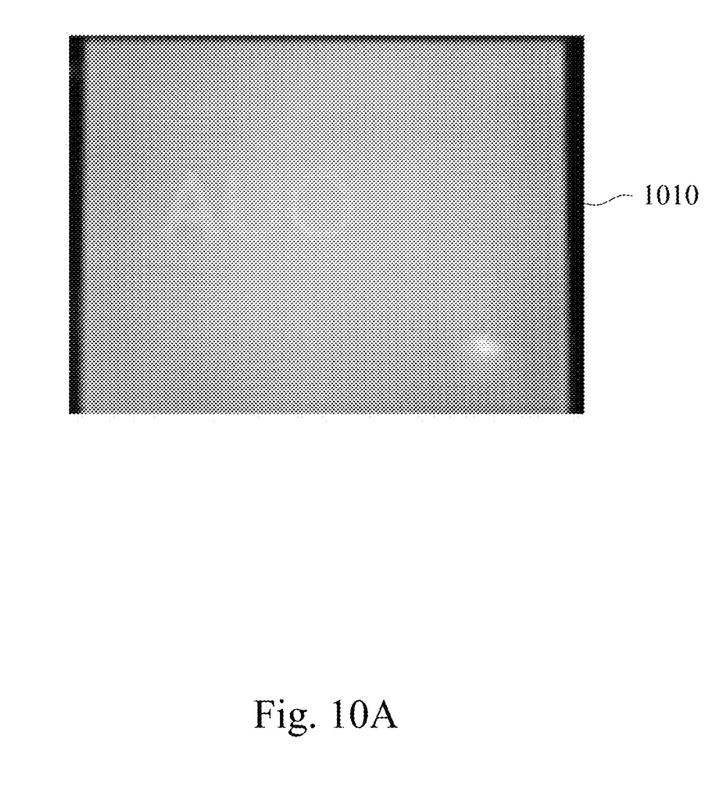
FIGS. 10A and 10B show schematic diagrams of image displayed by the display device according to the embedded watermark signal according to some embodiments of the present disclosure.
Figure 10B:
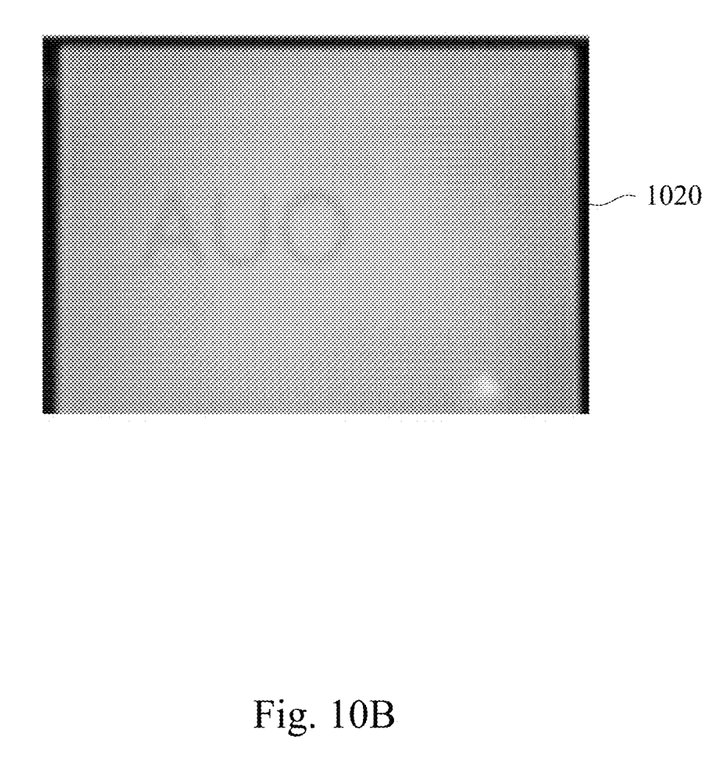

Reference is made to FIGS. 10A~10B. FIGS. 10A~10B shows schematic diagrams of images 1010 and 1020 captured by a camera from a screen of the display device 100 of FIG. 1 according to some embodiments of the present disclosure. As shown in FIG. 10A, in the exposure time of the camera, if the average value of the grayscale information IGRAa of the watermark signal of the display device 100 has a relatively large value, a watermark pattern of "AUO" with a relatively high grayscale is rendered in the image 1010 captured by the camera from the screen of the display device 100.

As shown in FIG. 10B, in the exposure time of the camera, if the average value of the grayscale information IGRAa of the watermark signal of the display device 100 has a relatively small value, a watermark pattern of "AUO" with a relatively low grayscale is rendered in the image 1010 captured by the camera from the screen of the display device 100, as shown in FIG. 10B.

Figure 11:
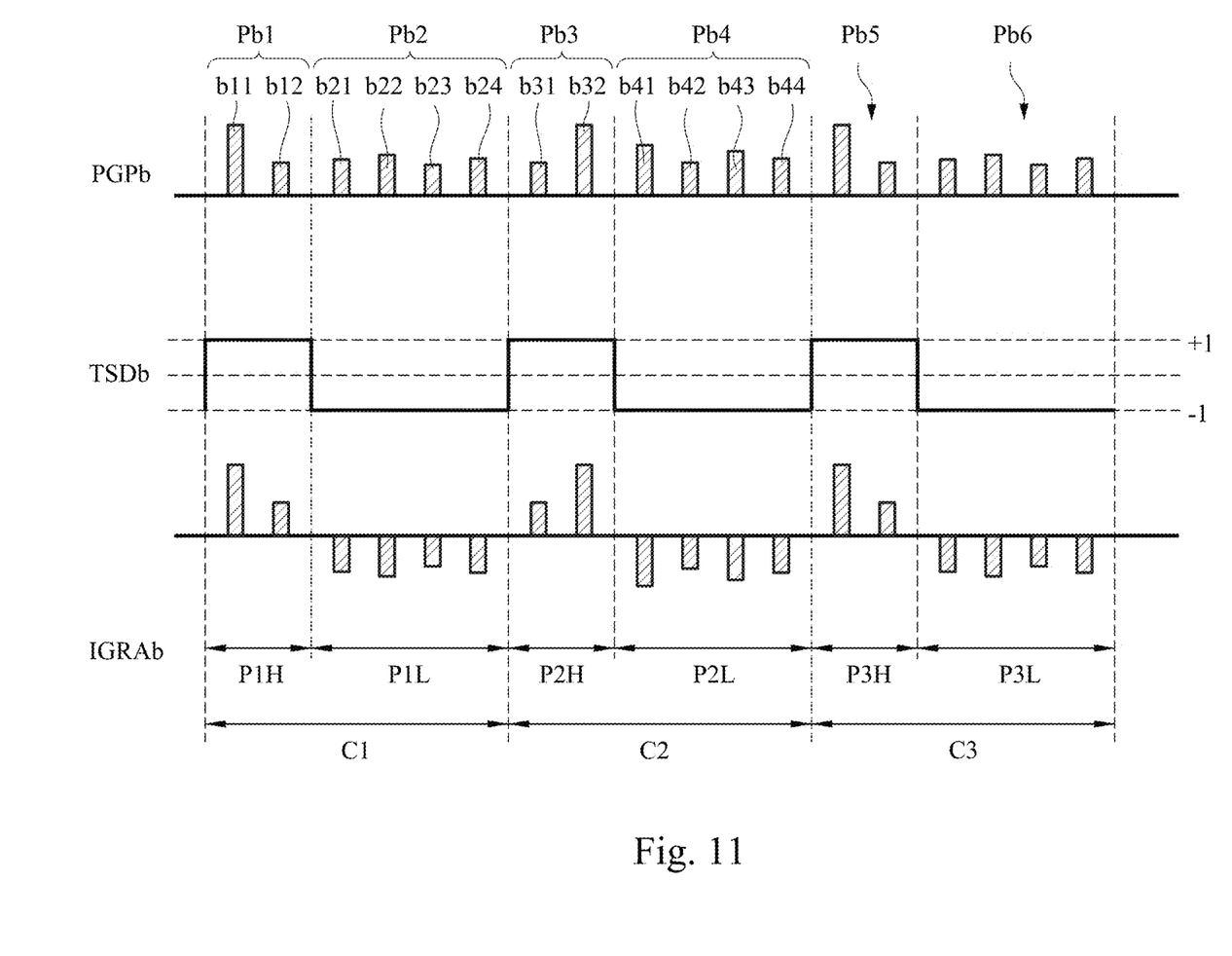
FIG. 11 shows a schematic diagram of a predetermined grayscale program, a time series data and grayscale information of a watermark signal according to some embodiments of the present disclosure.

FIG. 11 shows a schematic diagram of a predetermined grayscale program PGPb, a time series data TSDb and grayscale information IGRAb of a watermark signal according to some embodiments of the present disclosure. As shown in FIG. 11, in a first time period P1H, the time series data TSDa has a positive phase. In a second time period P1L, the time series data TSDa has a negative phase. As shown in embodiment of FIG. 11, the time length of the first time period P1H is 1/3 cycle, and the time length of the second time period P1L is 2/3 cycle. In embodiment of FIG. 11, a time length of the first time period P1H is different from a time length of the second time period P1L.

The predetermined grayscale program PGPb includes data program Pb1~Pb6 in cycles C1~C3. A sum value of grayscale b11~b12 included in the data program Pb1 is equal to a sum value of grayscale values b21~b24 included in the data program Pb2. An arrangement of the grayscale values b11~b12 included in the data program Pb1 is asymmetric with respect to an arrangement of the grayscale b21~b24 included in the data program Pb2 on time line.

An arrangement of grayscale values b31~b32 included in the data program Pb3 is mirror symmetric with respect to the arrangement of grayscale values b11~b12 included in the data program Pb1 on time line. An arrangement of grayscale values b41~b44 included in the data program Pb4 is mirror symmetric with respect to the arrangement of grayscale values b21~b24 included in the data program Pb2 on time line.

As a result, the arrangement of grayscale values of the predetermined grayscale program PGPb in a first cycle (such as, the cycle C1) of two continuous cycles is mirror symmetric with respect to the arrangement of grayscale values of the predetermined grayscale program PGPb in a second cycle (such as, the cycle C2) of two continuous cycles on time line. And, the grayscale information IGRAb of the watermark signal can be expressed as "high grayscale state, low grayscale state, low grayscale state" during first 1/3 cycle, 1/3~2/3 cycle and 2/3~3/3 cycle, so as to increase the possibility of capturing the watermark from the displayed image by the camera.

In other embodiments, the arrangement of grayscale values of the predetermined grayscale program in a first cycle of two continuous cycles is translation symmetric with respect to the arrangement of grayscale values of the predetermined grayscale program in a second cycle of two continuous cycles on time line. Therefore, it is not intend to limit the present disclosure.

Figure 12:
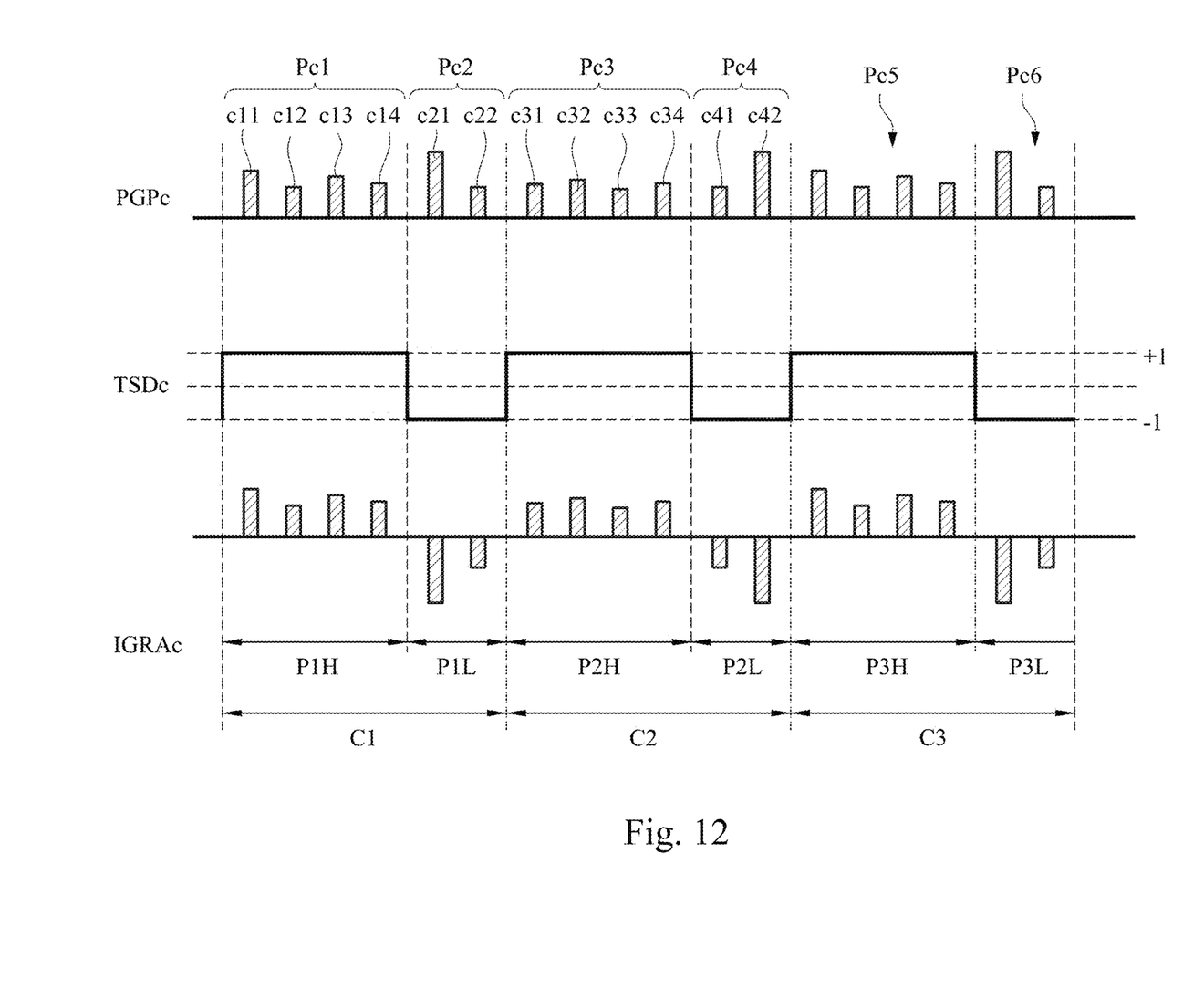
FIG. 12 shows a schematic diagram of a predetermined grayscale program, a time series data and grayscale information of a watermark signal according to some embodiments of the present disclosure.

FIG. 12 shows a schematic diagram of a predetermined grayscale program PGPc, a time series data TSDc and grayscale information IGRAc of a watermark signal according to some embodiments of the present disclosure.

The predetermined grayscale program PGPc includes data program Pc1~Pc6 in cycles C1~C3. A sum of grayscale values c11~c14 included in the data program Pc1 is equal to a sum of grayscale values c21~c22 included in the data program Pc2. An arrangement of the grayscale values c11~c14 included in the data program Pc1 is asymmetric with respect to an arrangement of the grayscale c21~c22 included in the data program Pc2 on time line.

Compare to the predetermined grayscale program PGPb, the time series data TSDb and the grayscale information of the watermark signal IGRAb, the difference from the predetermined grayscale program PGPc, the time series data TSDc and the grayscale information of the watermark signal IGRAc is that, in the embodiment of FIG. 12, the time length of the first time period P1H is ⅔ cycle, and the time length of the second time period P1L is ⅓ cycle, such that the grayscale information IGRAc of the watermark signal can be expressed as "high grayscale state, high grayscale state, low grayscale state" during first ⅓ cycle, ⅓ to ⅔ cycle and ⅔ to 3/3 cycle, so as to increase the possibility of capturing the watermark from the displayed image by the camera. The other operation method of the predetermined grayscale program PGPc, the time series data TSDc and the grayscale information of the watermark signal IGRAc is similar with/equal to the predetermined grayscale program PGPb, the time series data TSDb and the grayscale information of the watermark signal IGRAb. Therefore, the description is omitted here.

Summary, the backlight intensities of the backlight module 120 includes high dynamic watermark displayed in periodic, such that the image displayed by the display device 100 also includes the rendered dynamic watermark variated at high frequency with different grayscale values providing by the backlight module 120, so as to increase the possibility of capturing the watermark from the displayed image by the camera. And, in the condition of the high refresh rate of the backlight module 120, the watermark variated between the bright state and the dark state cannot be perceived by human eyes. Furthermore, since the operation frequency of the backlight module 120 can be in a range of 500 kHz~2 MHz, the variation of grayscale values of the watermark in each cycle can be more finely adjusted. And, the duration time of each grayscale can be set in different time lengths, so as to further increase the possibility of capturing the watermark from the displayed image by the camera.

Although the present disclosure has been disclosed in the above embodiments, but it is not limited thereto. Anyone who is familiar with this skill can make various changes and refinements without departing from the spirit and scope of this disclosure. Therefore, the scope of protection of this disclosure is subject to the definition of the scope of the patent application attached.

What is claimed is:

1. A watermark embedding method, comprising:
   generating a first local dimming signal, by a processing circuit, according to an input video signal;
   multiplying values of a predetermined grayscale program by value of time series data, by the processing circuit, respectively, to generate grayscale information of a watermark signal, wherein during a first time period and a second time period in each of a plurality of continuous cycles, phases of the time series data are opposite and integral values of the predetermined grayscale program are the same, to control a sum of the grayscale information of the watermark signal during the first time period and the second time period in each of the continuous cycles to be zero;
   embedding the watermark signal into the first local dimming signal, by the processing circuit, to generate a second local dimming signal with watermark information; and
   controlling light intensities of a plurality of local dimming zones, by a backlight module, according to the second local dimming signal with the watermark information.

2. The watermark embedding method of claim 1, further comprising:
   generating the predetermined grayscale program with a first data program in the first time period and a second data program in the second time period by the processing circuit, wherein an integral value of the first data program with respect to time is equal to an integral value of the second data program with respect to time, to control the sum of the grayscale information of the watermark signal during the first time period and the second time period comprised in each of the continuous cycles to be zero.

3. The watermark embedding method of claim 2, wherein a time length of the first time period is different from a time length of the second time period.

4. The watermark embedding method of claim 2, wherein a time length of the first time period is equal to a time length of the second time period.

5. The watermark embedding method of claim 2, wherein an arrangement of values in the first data program is translation symmetric with respect to an arrangement of values in the second data program on time line.

6. The watermark embedding method of claim 2, wherein an arrangement of values in the first data program is mirror symmetric with respect to an arrangement of values in the second data program on time line.

7. The watermark embedding method of claim 1, wherein an arrangement of the predetermined grayscale program during a first cycle of the continuous cycles is mirror symmetric with respect to an arrangement of the predetermined grayscale program during a second cycle adjacent to the first cycle of the continuous cycles on time line.

8. The watermark embedding method of claim 1, wherein an arrangement of the predetermined grayscale program during a first cycle of the continuous cycles is translation symmetric with respect to an arrangement of the predetermined grayscale program during a second cycle adjacent to the first cycle of the continuous cycles on time line.

9. The watermark embedding method of claim 1, further comprising:
   obtaining a first average value of the watermark signal during the first time period and obtaining a second average value of the watermark signal during the second time period by the processing circuit, and outputting the first average value and the second average value as a low dynamic watermark signal; and
   embedding the low dynamic watermark signal into the input video signal to generate a output video signal with the watermark information by the processing circuit.

10. The watermark embedding method of claim 9, further comprising:
   displaying image, by a liquid crystal panel synchronized with the backlight module, according to the output video signal with the watermark information.

11. A display device, comprising:
   a processing circuit; and
   a memory device, electrically coupled to the processing circuit, wherein the memory device is configured to store instructions and data accessed and executed by the processing circuit, wherein the processing circuit is configured to:
   multiply a time series data and a predetermined grayscale program, by the processing circuit, to generate grayscale information of a watermark signal, wherein during a first time period and a second time period comprised in each of a plurality of continuous cycles, phases of the time series data are opposite and integral values of the predetermined grayscale program are the same, to control a sum of the grayscale information of the watermark signal during a first time period and a second time period comprised in each of the continuous cycles to be zero;

embed the watermark signal into a first local dimming signal, by the processing circuit, to generate a second local dimming signal with watermark information; and provide the second local dimming signal to a backlight module, and wherein the backlight module controls light intensities of a plurality of local dimming zones according to with the watermark information.

12. The display device of claim 11, wherein the processing circuit is further configured to:

generate the predetermined grayscale program, by the processing circuit, according to a first data program in the first time period and a second data program in the second time period, wherein an integral value of the first data program with respect to time is equal to an integral value of the second data program with respect to time, to control the sum of the grayscale information of the watermark signal during the first time period and the second time period comprised in each of the continuous cycles to be zero.

13. The display device of claim 12, wherein a time length of the first time period is different from a time length of the second time period.

14. The display device of claim 12, wherein a time length of the first time period is equal to a time length of the second time period.

15. The display device of claim 12, wherein an arrangement of the first data program is translation symmetric with respect to an arrangement of the second data program on time line.

16. The display device of claim 12, wherein an arrangement of the first data program is mirror symmetric with respect to an arrangement of the second data program on time line.

17. The display device of claim 11, wherein an arrangement of the predetermined grayscale program during a first cycle of the continuous cycles is mirror symmetric with respect to an arrangement of the predetermined grayscale program during a second cycle adjacent to the first cycle of the continuous cycles on time line.

18. The display device of claim 11, wherein an arrangement of the predetermined grayscale program during a first cycle of the continuous cycles is translation symmetric with respect to an arrangement of the predetermined grayscale program during a second cycle adjacent to the first cycle of the continuous cycles on time line.

19. The display device of claim 11, wherein the processing circuit is further configured to:

generate a first local dimming signal, by the processing circuit, according to an input video signal.

20. The display device of claim 19, further comprising:

a liquid crystal panel, and wherein the processing circuit is further configured to:

obtain a first average value of the watermark signal during the first time period and obtaining a second average value of the watermark signal during the second time period by the processing circuit, and outputting the first average value and the second average value as a low dynamic watermark signal;

embed the low dynamic watermark signal into the input video signal to generate a output video signal with the watermark information by the processing circuit; and provide the output video signal to the liquid crystal panel, and wherein the liquid crystal panel displays an image, according to the output video signal with the watermark information, synchronized with the backlight module.

* * * * *